Figure 1:
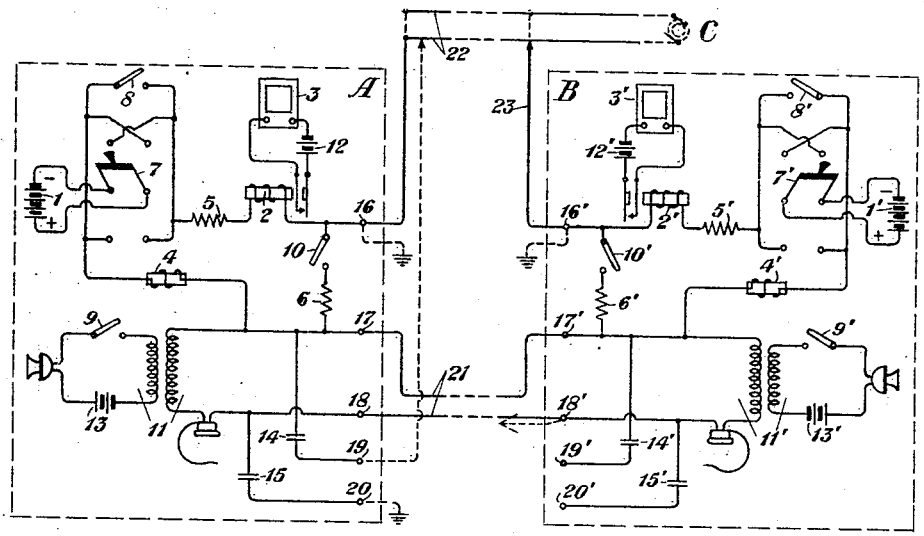

Oct. 1, 1929. T. C. HENNEBERGER 1,729,644

ELECTRICAL TESTING SYSTEM

Filed Oct. 7, 1927

INVENTOR.
T. C. Henneberger
BY
ATTORNEY

Patented Oct. 1, 1929

1,729,644

UNITED STATES PATENT OFFICE

THOMAS C. HENNEBERGER, OF MONTCLAIR, NEW JERSEY, ASSIGNOR TO AMERICAN TELEPHONE AND TELEGRAPH COMPANY, A CORPORATION OF NEW YORK

ELECTRICAL TESTING SYSTEM

Application filed October 7, 1927. Serial No. 224,677.

This application is a continuation in part of my application filed October 7, 1925, and given Serial No. 61.107.

The invention relates to electrical testing systems, and more particularly to arrangements for identifying the individual conductors in a group of conductors, the tests being made between any two points on the conductors.

The principal objects of the invention are to render the identification of conductors more simple and convenient, to prevent false indications in the testing system due to currents flowing in conductors of the group which are in use at the time of the testing operations, and to prevent interference from the testing system with circuits which include one or more of the conductors of the group and are in use at the time of the testing operations.

In testing arrangements used heretofore, the so-called "tone" method of testing is employed for the identification of conductors. In accordance with one type of tone test, for instance, the tester at one end of the line to be identified connects a tone producing device across the conductors of the line, and the tester at the distant point goes over the group of conductors with a "test pick" to which is attached an ordinary telephone receiver connected to ground in series with a condenser. When the tester at the distant point touches the right conductor with his test pick, he receives the tone in his receiver. This method of identifying conductors and the testing apparatus employed are not altogether satisfactory, particularly in cases of tests on long lines, in which cases the current attenuation is sufficient to require a testing current of considerable magnitude to produce the required tone in the tester's receiver. In these cases the testing currents may cause an appreciable amount of induction in lines adjacent to that under test; and, furthermore, the touching of the test pick to working circuits may cause serious conditions of unbalance in these circuits. Furthermore, if the tone method is employed, it is likely, because of the fact that many of the lines may be used to conduct currents of audible frequency for purposes other than speech communication, that false indications will be given in the tester's receiver and the wrong conductor selected in place of that which is to be identified.

To attain the above-stated and other objects of the invention and to overcome the above-stated objections to the form of testing system suitable to only the tone method of conductor identification, there is provided, in accordance with one feature of the present invention, means whereby direct currents are employed for the identification and other tests.

The second feature of my novel testing system is the provision of means whereby a metallic return path is provided for the circuit including the conductor to be identified, in order that interference with direct current circuits may be eliminated.

Another feature of the invention is the provision of suitable impedance means in the testing system for preventing interference with the working of alternating current circuits in the group of conductors which circuits include the conductor or conductors under test.

Another feature is the provision of annunciator apparatus, switching means for controlling the annunciator apparatus and associated means whereby the proper response of the annunciator apparatus to tests is insured and the false operation thereof prevented.

Another feature of the invention is the provision of means whereby the tester at one point may signal the tester at a distant point and means whereby the testers may establish a talking connection.

Another feature is the provision of conveniently operated means whereby the condition of the apparatus and the circuits of the testing system may be tested, in order that it may be ascertained whether or not the apparatus of the system is functioning.

Another feature is the provision of means whereby the testing arrangements of the invention may be utilized to identify conductors by the tone method discussed above, if the use of that method should for any reason prove desirable.

The above-stated and other features of the invention will be more clearly understood when the following description of my testing arrangements and the operation thereof is read with reference to the diagrams of the accompanying drawing.

Figure 1 of the drawing shows diagrammatically one form of testing system arranged in accordance with the invention, this form comprising two identical test sets at separate points in association with a line to be identified and a talking connection established between the two sets, and indicates, further, the connections required for the identification of a pair of talking conductors, the connections required for calling from one set to the other, and the connections required for the employment of the tone method of identification.

Figure 2:
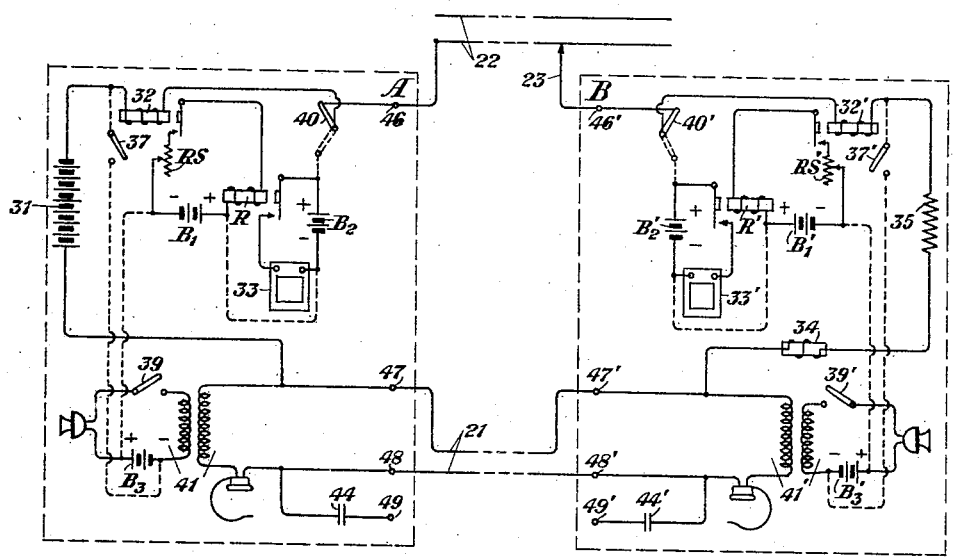

Fig. 2 shows diagrammatically a second arrangement of my testing system, desirable under certain conditions, this form being a modification of that shown in Fig. 1 and comprising a test set for use at the terminal and a test set for use at the distant testing point, in association with a line to be identified and an interconnecting talking pair, and furthermore indicates the circuits utilized for the local tests of the condition of the test sets.

With reference first to Fig. 1 of the drawing, there is shown a test set at a point A, usually a terminal point of a group of conductors, and a second test set at a point B, which is some point on the path of the group of conductors and will be referred to hereinafter as the "identifying point." The two test sets are identical. At the terminal point A, the set comprises a source of direct current 1, a test relay 2 which controls a circuit including a buzzer 3, an impedance coil 4, resistances 5 and 6, a battery reversing and cut out switch 7 associated with the direct current source 1, switches 8, 9 and 10, a telephone set 11, local circuit batteries 12 and 13, condensers 14 and 15, and terminals 16, 17, 18, 19 and 20. In labeling the corresponding elements of the test set at the identifying point B, like numerals, but primed, are employed.

The nature and advantages of testing systems arranged in accordance with this invention will be best understood from the following descriptions of various operations and tests which may be performed by means of the system shown in Fig. 1.

The first and principal test is the identification of conductors of a group of conductors. It is to be understood, of course, that a tester equipped with a set is positioned at each end of the group of conductors to be identified— for instance, one tester at A and the other at a distant point B. The procedure to be adopted is, in general, to identify one pair of conductors in accordance with one method and then to proceed to the identification of the other conductors with the aid of the pair just identified, which may be used as and will be referred to hereinafter as the talking pair, in accordance with another method. These two steps will now be described in detail:

The tester at point A picks out an idle pair of conductors at random, the pair 21 for instance, connects the terminals 17 and 18 of his set to these conductors and then closes the switch 7 in the direction to pole the battery 1 so as to cause a flow of current therefrom in a certain direction which accords with a predetermined plan of operation agreed upon by the two testers. For the identification of this talking pair, the terminal 16 of the set at A and the terminal 16' of the set at B are connected to ground, as indicated by broken lines on the drawing. The tester at point B now sets his switch 7' so that current from the battery 1' of his set will aid the current from battery 1 at A. He then goes over the conductors at his end of the group of conductors with a test pick (indicated on the drawing by a broken line arrow), which is connected to the terminal 18' (or 17') of his set. Let it be assumed that he touches the lower conductor of pair 21 [one conductor of the pair]. (The broken line extension of the upper conductor of the pair 21 on Fig. 1 indicates that, at this stage of the testing operations, this conductor [the other conductor of the pair] is not connected to the test set at B.) When the pick touches the conductor indicated, a circuit is completed as follows: from ground over terminal 16 at A, through relay 2, resistance 5, through battery 1 connected by switch 7, impedance coil 4, the receiver circuit of telephone set 11, terminal 18, the lower conductor of pair 21, the test pick connected to terminal 18' at B, the receiver circuit of telephone set 11', impedance coil 4', battery 1' through switch 7', resistance 5', and relay 2' to ground at B over terminal 16'. The relays 2 and 2' of the sets at A and B, respectively, will now operate and complete circuits through buzzer 3' and battery 12', respectively. The buzzers operate and serve to notify the testers that the talking pair (21) has been located. The tester at B then connects the conductors of this pair to his terminals 17' and 18', and the talking circuit is established in the form of a metallic loop.

The testers now proceed to identify other pairs in the group of conductors extending between A and B. The connections required for the performance of this testing operation are indicated by the full lines of Fig. 1. It is to be noted that the ground connections at terminals 16 and 16' are now removed; also it is to be noted that the tester at A now establishes a connection between terminal 16 of his set and one conductor of a pair 22, which is to be identified. The tester at B connects a test pick 23 to the terminal 16' of his set and proceeds to go over the various conductors of the group in search of the pair 22. When the pick 23 touches the lower conductor of that pair (i. e., the conductor which has been connected to the test set at A), the following circuit is completed: from terminal 16 at A, through relay 2, resistance 5, battery 1 connected by switch 7, through impedance coil 4, telephone set 11, talking pair 21 to B, through telephone set 11', impedance coil 4', battery 1' connected by switch 7', resistance 5', relay 2', terminal 16' and test pick 23, back to the test set terminal 16 at A over the lower conductor of pair 22. The relays 2 and 2' will now operate to cause, as described above, the production of buzzer signals to notify the testers that the pair (22) has been identified. The testers may then proceed to identify other conductors in a like manner.

It is to be noted that the test for identifying conductors as described immediately above is performed with the batteries 1 and 1' connected in the system of Fig. 1 in series aiding relation. This arrangement of the system in this form is desirable if the lines under test are of considerable length—say, 10 miles or greater. For shorter lines, however, the voltage furnished by the two batteries in series is greater than that required; accordingly, in such a case, one or the other of the testers may, in accordance with a pre-arranged plan, open his switch 7 (or 7') to cut his battery out of the test circuit and close his switch 8 (or 8') to complete the circuit directly from impedance coil 4 (or 4') to resistance 5 (or 5'), the other set, of course, remaining with the battery 1' (or 1) connected in the test circuit through closed switch 7' (or 7). With operation in this manner, it is possible to use identical and therefore interchangeable test sets at points A and B and yet effect a considerable saving of battery consumption when the conductors to be identified are relatively short.

The function of the impedance or retardation coils 4 and 4', included in the test circuit, is to prevent the production of serious conditions of unbalance in telephone lines or other alternating current circuits which are in use and with which the test pick 23 may come in contact during the operation of searching at point B for the desired conductor. With these coils in the circuit, there is a great reduction of drain from these alternating current circuits through the distributed capacitance of the line 21, since the retardation coils offer a high impedance to alternating currents.

The provision of the talking pair 21 as a part of the testing circuit serves the purpose of preventing interference with grounded or metallic direct current telegraph circuits in cases in which the tester at B touches his pick 23 to such a circuit during the identification of conductors, since, with this arrangement, there is no closed circuit to ground from the telegraph circuit through the test sets during such tests.

Even though there be full prevention of interference by the test sets with working lines of the various types named above, the relays 2 and 2' may be caused to chatter if the test pick 23 comes in contact with direct current telegraph circuits, unless suitable precautions are taken. For instance, at the instant a telegraph key is opened or closed the rapid change of voltage along the telegraph line causes a "surge" alternating current, and, if the test pick 23 should touch the telegraph line, a portion of the surge current would flow through the test set, because of the capacitance of the talking pair 21 to ground. Accordingly, the resistances 5 and 5' are inserted at A and B, respectively; these resistances, added to the impedance of the other apparatus of the sets, will—in many cases, at least, reduce the surge currents to a value too low to cause disturbing effects in the test relays 2 and 2'.

It is often necessary or desirable that the testers at the two points A and B communicate with each other, and the talking pair 21 may be used to meet this requirement. A special call circuit for this testers' communication may be established as follows: A pair—the pair 22 of Fig. 1, for example—may have one conductor (the lower, for instance) connected to terminal 16 at A, as shown in full lines, and the other conductor (the upper) connected to terminal 16' of the set at B, as indicated by the broken line extension of the pick conductor 23. If the tester at point A wishes to call the tester at B, he will open the connection from terminal 16 to the lower conductor of pair 22 and touch the lead (from 16) to the upper conductor of the pair. He thus completes a circuit through the test sets over this upper conductor, and the buzzers of the sets will be actuated. When the tester at B hears the buzzer signal, he will understand that the tester at A wishes to communicate with him; the testers will then close the switches 9 and 9', completing the transmitter circuits of the telephone sets 11 and 11', and talk over the pair 21.

The testing system, while designed to provide testing arrangements superior to those requiring the tone method, may be used for identifying conductors in accordance with that well-known method. The tester using the set at the point A, for example, may conduct tone tests with a tester at some distant point C. In this case, C would be the terminal point. The terminal 20, in circuit with a condenser 15, is connected to ground, and the terminal 19, in circuit with a condenser 14, is connected to a test pick shown in Fig. 1 in broken line. (There are, of course, no connections to the other terminals of the set.) The tester at point C connects a tone source (shown in broken line) to a pair—22, for instance,—which is to be identified. The tester at A then goes over the various conductors of the group with the test pick connected to terminal 19, and when he touches either conductor of the pair 22, a circuit is completed as follows: from the tone source at C, over the identified (lower) conductor of pair 22, through the test pick, terminal 19, condenser 14, telephone set 11, condenser 15, and terminal 20 to ground, and back to C through the capacitance of pair 22 to ground. The tester at A then knows from the tone in his receiver that the pair is identified. If a talking pair (as 21) is available, the connection from terminal 20 to ground may, except in cases of very short lines, be omitted, and the capacitance to ground of the talking pair will take the place of condenser 15.

The test sets of the system are, furthermore, so arranged that the operation of the relay and buzzer circuits may readily be tested. With the set at A taken for example, the switch 10 may be closed and the following circuit completed: from relay 2, through resistance 5, battery 1 connected into the circuit through switch 7, coil 4, resistance 6, and switch 10 back to relay 2. If the relay and the relay circuit are in operative condition, relay 2 will be actuated; and the closing of this relay closes the buzzer circuit, giving a test of the condition of that circuit.

There may be, and often are, conditions under which the testing system arranged as shown in Fig. 1 of the drawing will not provide sufficient protection against interference between the testing system and working telegraph circuits in the group including one or more of the conductors under test, and modification of the system will be necessary in order to prevent excessive chattering of the test relays of the sets and false operation of the buzzers controlled thereby, and to prevent a drain of current from the telegraph circuit so great as to affect the telegraph operation. The system as modified to produce this added protection against interference may take the form diagrammatically shown in Fig. 2 of the drawing.

In the modified system of Fig. 2, the two test sets, one at point A, which will usually be a terminal point, and the other at a point B distant from A, are not identical and consequently not interchangeable. The principal modification, with respect to the system of Fig. 1, is found in (1) the substitution of a slow acting relay system for the test relays and (2) the position and number of the current source and impedance elements.

With reference first to the showing on Fig. 2 of the set at the terminal point A, a test relay 32, a buzzer 33, a telephone set 41 with transmitter circuit switch 39, and terminals 46, 47 and 48 correspond to like elements in the test sets of Fig. 1. Interposed between relay 32 and the circuit of buzzer 33, there is a second relay R in circuit with a battery and a rheostat RS. By means of this rheostat, the current through the circuit of relay R may be adjusted to a value just sufficient to cause the operation of that relay. Consequently, the maximum time lag may be introduced into the operation of the relay system, which controls the operation of the buzzer, and accordingly added protection is provided against serious chattering of relay R and false operation of the buzzer when working telegraph circuits are touched by the test pick 23.

At the "identifying" point B, the set includes a relay 32′, a second relay R′, a rheostat RS′, a buzzer 33′, a telephone set 41′, with transmitter circuit switch 39′, and terminals 46′, 47′, and 48′, corresponding to the elements of the set at A. The entire series resistance for the test circuit of the system is placed in the set of point B, at 35, and the entire protective impedance of the circuit is furnished at B by the retardation coil 34.

In the system as shown in Fig. 2, the testing battery (1 and 1′ of Fig. 1) is not divided, half being placed at A and half at B, but is found as a unit 31 at A, the end of the system at which the conductors to be identified are known and direct connection is made from the test set to the conductors of the group to be tested. As explained above in connection with Fig. 1, the identification of conductors with my testing system involves the use of a talking pair (21), and initially this talking pair is identified with ground return employed for the test circuit. In certain cases, if one half of the battery which furnishes the direct test current is placed at point B, there will be a reaction of the test battery on the telegraph battery of working metallic telegraph circuits touched by the test pick during the talking pair identification test, and these telegraph circuits may be rendered inoperative thereby. Any such undesirable effect is avoided by the arrangement of Fig. 2.

It being understood that, as indicated above, the talking pair 21 is identified with the use of ground return as fully described in connection with the operation of the system of Fig. 1, it will now clarify the description of the modified test system to trace the circuit of Fig. 2 which is completed when the test pick 23 at B touches the lower conductor of pair 22, for instance, in the subsequent identification of the individual conductors of the group. This circuit is from terminal 46 at A, through relay 32, battery 31, telephone set 41, talking pair 21 to B, through telephone set 41′, retardation coil 34, resistance 35, relay 32′, terminal 46′ and test pick 23, back to terminal 46 at A over the lower conductor of pair 22. With this circuit completed, relays 32 and 32′ will operate and, after a short delay, cause the operation of relays R and R′, and buzzers 33 and 33′ will be actuated, notifying the testers at A and B, respectively, of the conductor identification.

Either test set as specifically shown in Fig. 2 may be employed for the tone method of conductor identification on any lines which are not very short—in combination, of course, with a tone source at the distant point. When the set is used for a tone test, the terminal 49 (or 49'), in circuit with the condenser 44 (or 44') is connected to the line by a conductor and a pick, and the capacitance between the talking pair 21 and ground serves in the manner described above in connection with the discussion of the tone test with a set as disclosed in Fig. 1.

In the modified set of Fig. 2, when the local test of the relay circuits is to be made, a circuit is closed through the relay 32 (or 32') and the local batteries $B_1$ $B_2$, and $B_3$ (or $B_1'$, $B_2'$ and $B_3'$), the conductor test circuit source 31 not being used in the case of the set at A. This local test circuit is indicated by the broken line, and is diagrammatically shown as completed when switch 37 (or 37') is closed and switch 40 (or 40') is thrown to the broken line position.

While my direct current testing system has been specifically described in two forms, for the purpose of illustration, it is to be understood that the true scope of the invention is not limited thereby, but is defined by the appended claims.

What is claimed is:

1. In a testing system for identifying individual conductors of a group of conductors, a source of direct current, means for offering a high impedance to alternating currents, a relay at each of two separated points in the system, and means for connecting in series relation said source of direct current, said impedance means, said relays and the conductor to be identified.

2. In a testing system for identifying individual conductors of a group of conductors, a source of direct current, means for offering a high impedance to alternating currents, a relay at each of two separated points in the system, means at each of said points for giving a signal in response to the operation of the relay, and means for connecting in series relation said source of direct current, said impedance means, said relays and the conductor to be identified.

3. In a testing system for identifying individual conductors of a group of conductors, a talking circuit including a pair of conductors of the group, a source of direct current, impedance means, a relay at each of two separated points in the system, and means for connecting in series in a metallic loop the talking pair, said source of direct current, said impedance means, the relays and the conductor to be identified.

4. In a testing system for identifying individual conductors of a group of conductors, a talking circuit including a pair of conductors of the group, a source of direct current, impedance means, a relay at each of two separated points in the system, means at each of said points for giving a signal in response to the operation of the relay, and means for connecting in series in a metallic loop the talking pair, said source of direct current, said impedance means, the relays and the conductor to be identified.

5. In a testing system, a metallic loop circuit including in series relation a conductor to be identified, a talking circuit comprising a pair of conductors, a source of direct current, impedance means, and at each of two separated points in the system a testing relay.

6. In a testing system, a metallic loop circuit including in series relation a conductor to be identified, a talking circuit comprising a pair of conductors, a source of direct current, impedance means, and at each of two separated points in the system a relay, and at each of the said two points means controlled by the relay for giving a signal.

7. In a testing system, a metallic loop circuit including in series relation a conductor to be identified, a talking circuit comprising a pair of conductors, a source of direct current, impedance means, and at each of two separated points in the system a relay, and at each of the said two points means controlled by the relay for giving a signal and a telephone set.

8. A testing system for identifying individual conductors of a group of conductors, said system comprising a source of direct current, two test circuits, one at each of two separated points in the system, adapted to be connected together in series with said source of direct current in a metallic loop of which a conductor to be identified forms one link and another conductor of the group forms another link, a relay in each test circuit, and impedance means in said loop adapted to prevent interference between the testing system and neighboring conductors of the group.

9. A testing system for identifying individual conductors of a group of conductors, said system comprising a source of direct current, two test circuits, one at each of two separated points in the system, adapted to be connected together in series with said source of direct current in a metallic loop of which a conductor to be identified forms one link and another conductor of the group forms another link, a relay in each test circuit, means controlled by each relay for giving a signal, and impedance means in said loop adapted to prevent interference between the testing system and neighboring conductors of the group.

In testimony whereof, I have signed my name to this specification this 6th day of October, 1927.

THOMAS C. HENNEBERGER.